(12) United States Patent
Columbano

(10) Patent No.: US 9,072,423 B1
(45) Date of Patent: Jul. 7, 2015

(54) DEBRIS COLLECTION APPARATUS

(71) Applicant: Jack Columbano, Fresh Meadows, NY (US)

(72) Inventor: Jack Columbano, Fresh Meadows, NY (US)

(*) Notice: Subject to any disclaimer, the term of this patent is extended or adjusted under 35 U.S.C. 154(b) by 221 days.

(21) Appl. No.: 13/897,478

(22) Filed: May 20, 2013

(51) Int. Cl.
  *B65D 79/00* (2006.01)
  *A47F 5/08* (2006.01)
  *A47L 13/52* (2006.01)

(52) U.S. Cl.
  CPC .................................... *A47L 13/52* (2013.01)

(58) Field of Classification Search
  CPC ............... B65D 33/14; B65D 83/0841; B65D 83/0882; B65D 5/42
  USPC ................. 206/389, 408, 395, 527, 225, 460; 225/48–50
  See application file for complete search history.

(56) References Cited

U.S. PATENT DOCUMENTS

| | | | | |
|---|---|---|---|---|
| 2,803,339 A | * | 8/1957 | Kuchenbecker | 206/396 |
| 2,880,860 A | * | 4/1959 | Rhoades et al. | 242/160.4 |
| 4,263,347 A | * | 4/1981 | Banta | 427/282 |
| 4,263,355 A | * | 4/1981 | Sarkisian | 428/124 |
| 5,640,827 A | * | 6/1997 | Van Someren et al. | 428/343 |
| 5,911,324 A | * | 6/1999 | Hammer | 206/527 |

* cited by examiner

*Primary Examiner* — Mickey Yu
*Assistant Examiner* — Chun Cheung
(74) *Attorney, Agent, or Firm* — Gulf Coast Intellectual Property Group

(57) ABSTRACT

A disposable debris collection apparatus that is operable to collect debris from either a horizontal surface or a vertical surface. The disposable debris collection apparatus further includes a body stored in a first position within a container. The body is planar in manner and operable to be dispensed in portions from said container to be folded into at least a first section and a second section so as to collect debris. The body further includes a first and second adhesive strip proximate the front edge of the body wherein the first and second adhesive strip are parallel and extend the entire longitudinal length of the body. A plurality of longitudinal seams are formed on said body proximate a rear edge wherein the plurality of longitudinal seams are operable to facilitate the configuring of said body into a second position so as to collect debris.

11 Claims, 3 Drawing Sheets

US 9,072,423 B1

DEBRIS COLLECTION APPARATUS

FIELD OF THE INVENTION

The present invention relates to debris collection devices, more specifically but not by way of limitation, a debris collection device that is stored in a rolled form that can be dispensed and manipulated to create a dustpan that is operable to provide assistance in the collection of debris.

BACKGROUND

It is a routine part of household maintenance and cleaning to regularly perform certain chores as part of maintaining the facility. Tasks such as dusting furniture and vacuuming the floors are some of the routine tasks that homeowners regularly perform. Sweeping certain floor types is also a common task in which homeowners will engage in at regular intervals. Certain floor types such as wood or tile are easily cleaned by routine sweeping. As is known in the art, sweeping typically utilizes a broom and a collection device commonly known as a dustpan. An individual will utilize the combination of the broom and the dustpan to either clean debris from a spill or they can be used to clean the entire floor.

One problem with conventional dustpans is their generally unsanitary condition. Most dustpans are not routinely cleaned or disinfected and are not suitable to be utilized where the homeowner prefers a hygienic method of collecting debris. By way of example but not limitation, if debris is desired to be collected from a kitchen countertop, a conventional dustpan is not a desirable device to use, as its unsanitary condition is not recommended for a surface such as a kitchen countertop.

Another problem with conventional dustpans is that not all debris will be collected by the dustpan when in use and a portion of the debris propagates under the front edge of the dustpan. Conventional dustpans have a front edge that is usually tapered so as to maximize the amount of debris collected into the cavity. Unfortunately in spite of this design at least a portion of the debris still is forced under the front edge of the dustpan and is not collected by the cavity. A further issue with the design of a conventional dustpan is its inability to adapt to collect debris during the performance of other household tasks. For example but not by way of limitation, during drilling a hole in dry wall to mount a fastener, dry wall debris is created and drops down the surface of the vertically oriented wall and is deposited on the floor. The structural design of a conventional dustpan does not allow a user to collect debris in the aforementioned exemplary scenario.

Accordingly, there is a need for a disposable and configurable dustpan that is hygienic and promotes effective collection of debris from both horizontal surfaces and vertically oriented surfaces.

SUMMARY OF THE INVENTION

It is the object of the present invention to provide a debris collection device that is disposable that is planar in manner and stored in a rolled position in a container for dispensing thereof.

Another object of the present invention is to provide a disposable debris collection device that is planar in manner and operable to be dispensed in various different lengths.

Still another object of the present invention is to provide a disposable debris collection device that is planar in manner and stored in a rolled form in its first position wherein the planar body has a first edge and a rear edge.

A further object of the present invention is to provide a disposable debris collection device that further includes a first adhesive strip and a second adhesive strip on the lower surface of the body.

Yet another object of the present invention is to provide a disposable debris collection device that includes at least two longitudinal perforated seams proximate the rear edge of the body.

An additional object of the present invention is to provide a disposable debris collection device that is configurable to be folded into a second position subsequent dispensing from its first rolled position wherein in the second position the body has been formed to create a cavity.

Yet a further object of the present invention is to provide a disposable debris collection device that is operable to be suspended mounted on a vertical wall in order to collect debris falling down the surface of the wall.

Another object of the present invention is to provide a disposable debris collection device that is lightweight and cost effective to use.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
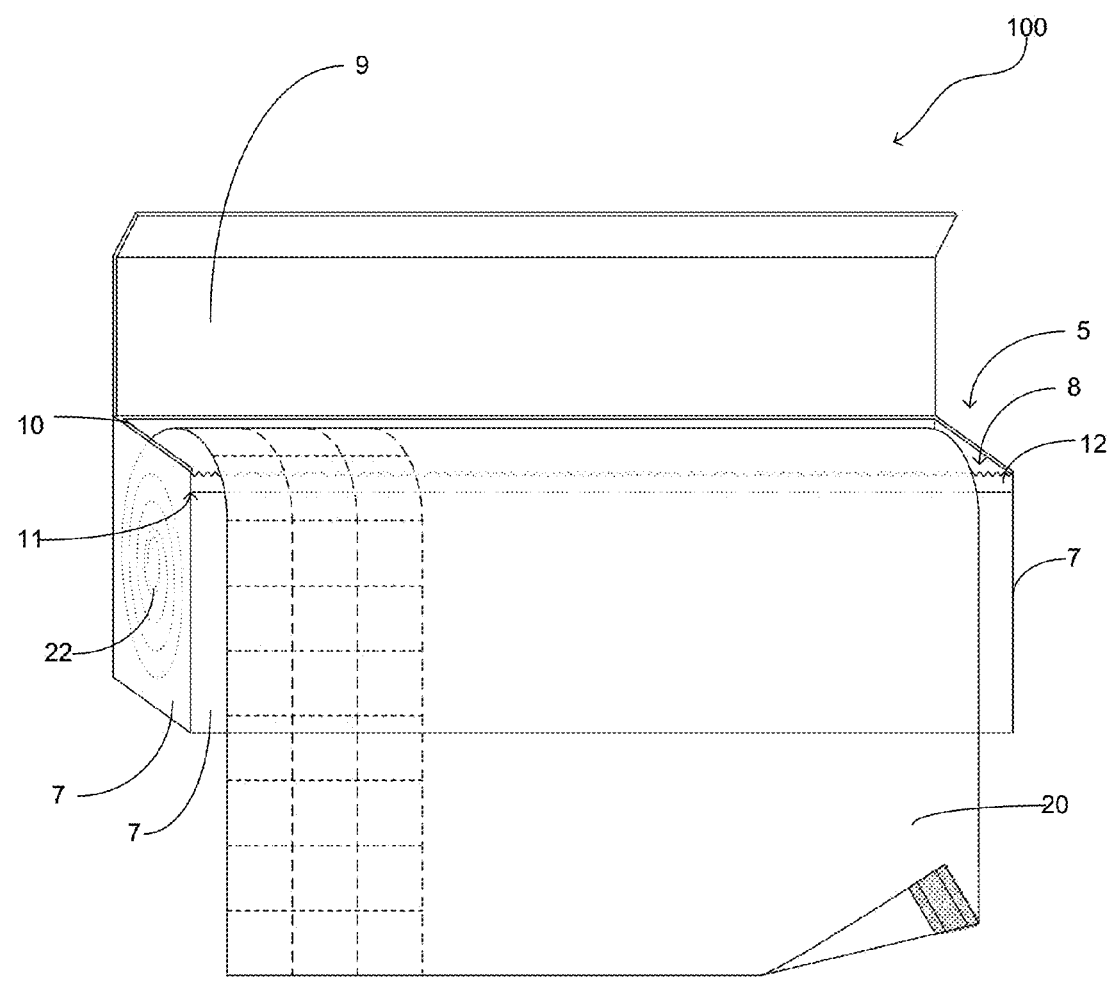
FIG. 1 is a perspective view of an embodiment of the present invention stored in its first position in the container.

Referring now to the drawings submitted herewith, wherein various elements depicted therein are not necessarily drawn to scale and wherein through the views and figures like elements are referenced with identical reference numerals, there is illustrated a debris collection apparatus 100 constructed according to the principles of the present invention.

The debris collection apparatus 100 includes a container 5 that is generally rectangular in shape and constructed of a durable material such as but not limited to cardboard. The container 5 includes a plurality of walls 7 formed to create an interior volume 8. A hingedly attached lid 9 is proximate the opening 10 of the container 5. Disposed along the upper front perimeter edge 11 proximate the opening 10 is a serrated blade 12. The serrated blade 12 is operable to cut a portion of the body 20 that has been dispensed from the container 5. The body 20 of the debris collection apparatus is stored in a first position within the container 5. In the first position, the body 20 is stored in a rolled manner around a support tube 22. While a container 5 has been described herein being configured to store the body 20 in a rolled position, it is contemplated within the scope of the present invention that the container 5 could be formed in numerous different shapes and size and still accomplish the desired objective as described herein. Furthermore, it is additionally contemplated within the scope of the present invention that numerous other cutting devices could be used in addition to and/or in conjunction with the serrated blade 12.

Figure 2:
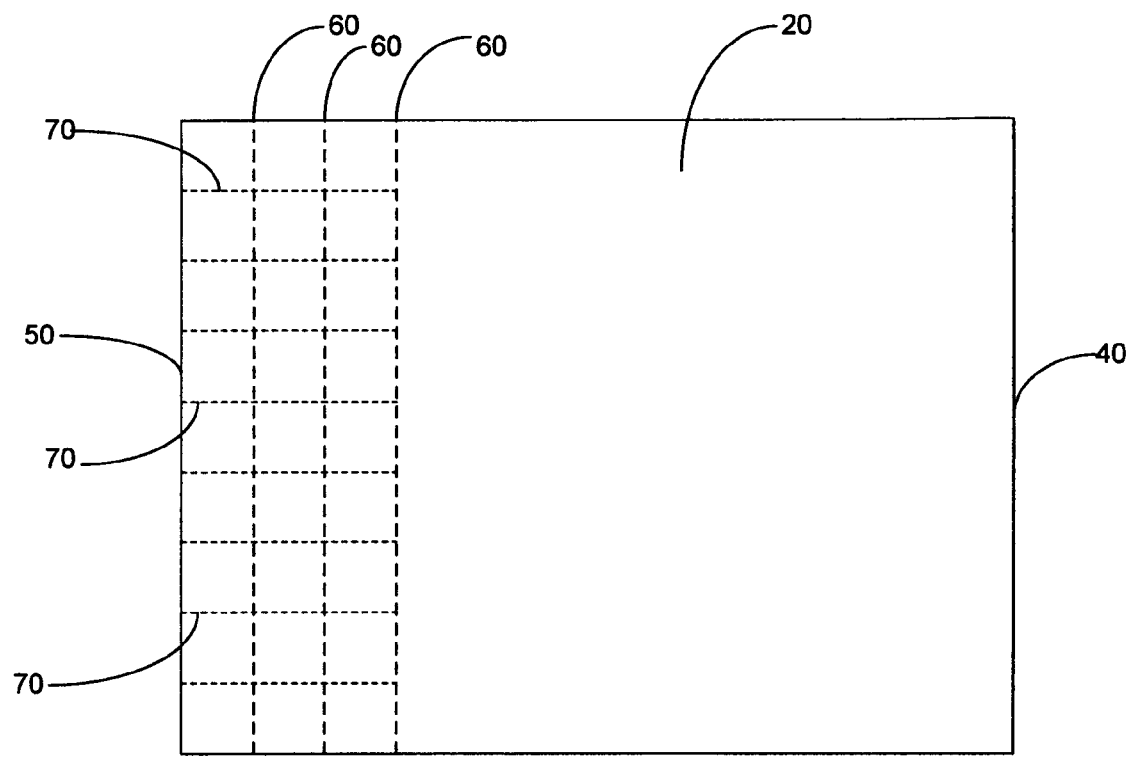
FIG. 2 is a top view of a portion of the present invention.
Figure 3:
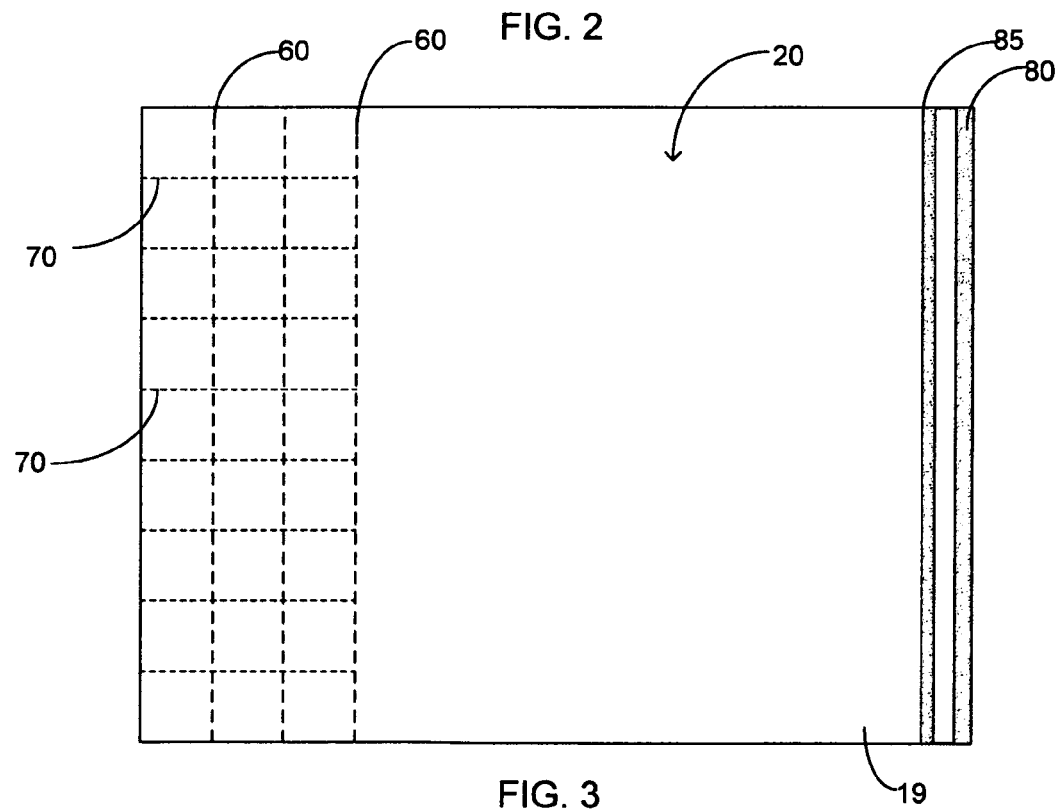
FIG. 3 is a bottom view of a portion of the body of the present invention.

Referring in particular to FIGS. 2 and 3, the body 20 is shown therein. The body 20 is manufactured from a suitable durable material such as but not limited to a heavy bond paper. The body 20 is manufactured from a material that can be stored in a rolled position and subsequently dispensed and a heavy bond paper or similar material is preferred as that type of material allows the body 20 to be easily cut with the serrated blade and can be manipulated as described further herein. The upper surface 30 of the body 20 is shown in FIG. 2. FIG. 2 illustrates a usable portion of the body 20 that has been dispensed from the container 5. The body 20 is generally planar in manner having a first edge 40 and a second edge 50. While no particular width of the body 20 is required, good results have been achieved utilizing a body 20 that has a width range of approximately twelve to sixteen inches between the first edge 40 and second edge 50. Proximate the second edge 50 are a plurality of longitudinal seams 60. The longitudinal seams 60 extend the entire length of the body 20 and are operable to assist the user in manipulating the body 20 into a second position wherein in the second position the body 20 is configured to collect dust or debris. The longitudinal seams 60 are formed from perforations or similar manufacturing techniques. Subsequent a portion of the body 20 being dispensed from the container 5, a user will fold the body 20 along the desired longitudinal seam 60 as illustrated in particular in FIG. 4. While in the drawings submitted herewith there are three longitudinal seams illustrated therein, it is contemplated within the scope of the present invention that the body 20 could have as few as one longitudinal seam 60 or a number greater than three longitudinal seams 60.

A plurality of lateral seams 70 are further formed on the body 20 using the same manufacturing technique utilized to form the longitudinal seams 60. The lateral seams 70 function to provide an option to the user to substantially close the ends 97,98 (See FIG. 4) of the cavity 95 formed subsequent a user manipulating the body 20 into its second position. The exemplary illustration in FIG. 4 does not illustrate the body 20 wherein the lateral seams 70 have been folded to substantially close the ends 97,98 but are present to provide this option to a user. The lateral seams 70 extend from the second edge 50 towards the first edge 40 and only extend as far as the most inward longitudinal seam 60. It is contemplated within the scope of the present invention that any number of lateral seams 70 could be present. Additionally, while the lateral seams 70 are illustrated herein as being approximately evenly distributed, it is contemplated that the lateral seams 70 could be formed in numerous different distributions having varying space intermediate each lateral seam 70.

Figure 4:
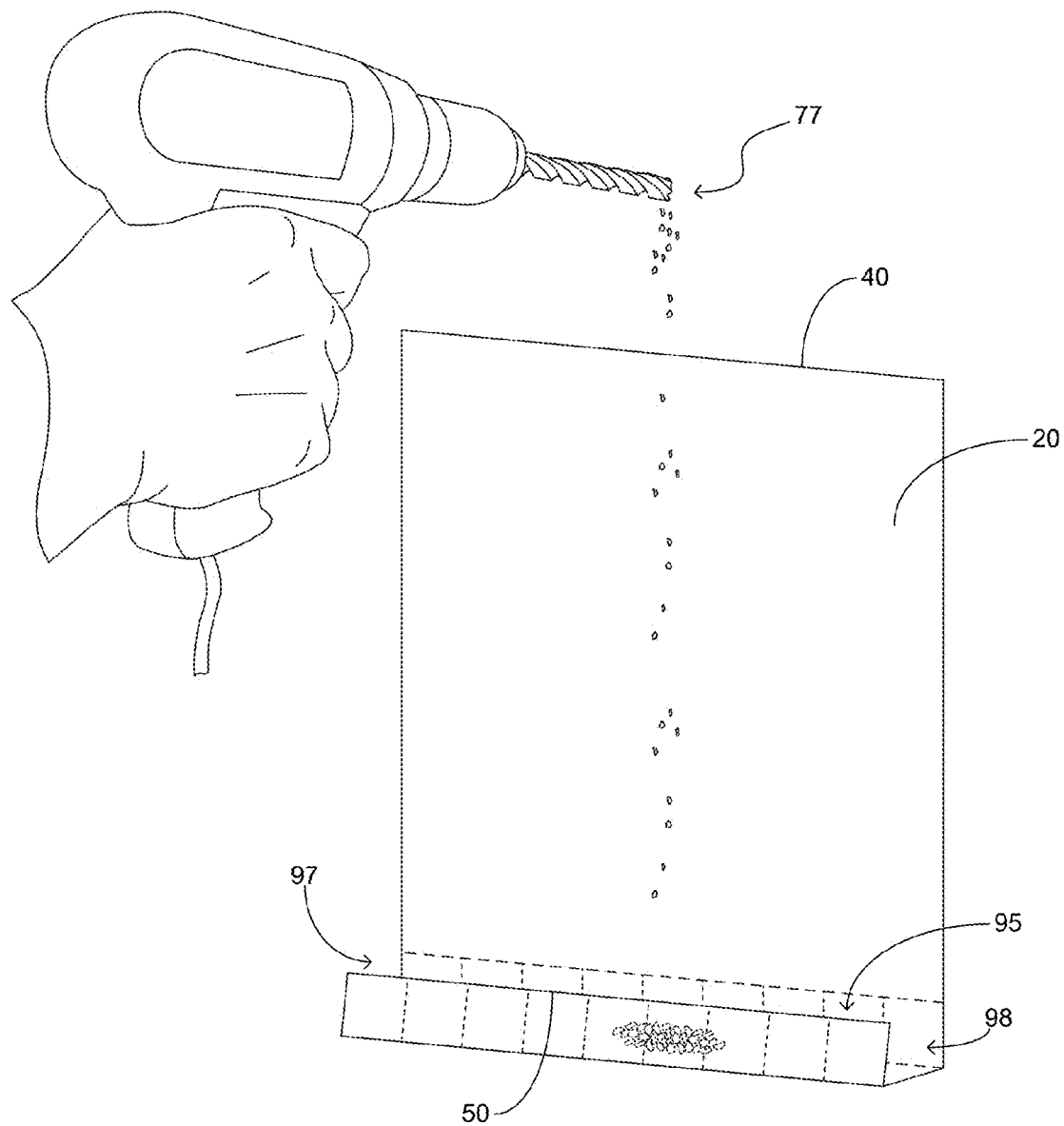
FIG. 4 is a perspective view of the present invention in its second position secured to a vertical wall.

Referring in particular to FIG. 3, a view of the bottom surface 19 of the body 20 is illustrated therein. Proximate the first edge 40, the bottom surface has disposed thereon a first adhesive strip 80 and a second adhesive strip 85. The first adhesive strip 80 extends longitudinally the entire length of the body 20 and is adjacent the first edge 40. While any type adhesive can be utilized for the first adhesive strip 80, good results have been achieved by utilizing a pressure sensitive adhesive for the first adhesive strip 80. The first adhesive strip 80 functions to ensure that the first edge 40 is releasably secured to a desired surface so as to ensure that any debris being swept onto the body 20 does not propagate underneath the front edge 40. This configuration provides a distinct advantage over existing technologies and ensures that substantially all of the debris is swept onto the body 20 for collection. The second adhesive strip 85 extends longitudinally the entire length of the body 20 and is generally parallel with the first adhesive strip 80. A void 83 is present intermediate the first adhesive strip 80 and the second adhesive strip 85. The void 83 is present as the placement of the second adhesive strip 85 is operable to assist in the releasable securing of the debris collection apparatus 100 to a vertically oriented wall as shown in FIG. 4 submitted herewith. Placing the second adhesive strip 85 a slight distance from the first adhesive strip 80 facilitates an improved securing of the body 20 to the vertically oriented wall. The second adhesive strip 85 is manufactured from the same adhesive material as the first adhesive strip 80. While in the embodiment disclosed herein a first adhesive strip 80 and a second adhesive strip 85 have been disclosed, it is contemplated within the scope of the present invention that as few as one adhesive strip could be utilized or additionally it is contemplated that more than two adhesive strips could be utilized.

Illustrated in FIG. 4 herein, is an exemplary use of the debris collection apparatus 100. In the illustrated exemplary use, the debris collection apparatus 100 has been releasably secured onto a vertically oriented wall to capture falling debris. The body 20 has been dispensed from the container 5 and a desired length thereof was separated from the rolled body 20 stored in the container 5 using the serrated blade 5. The debris collection apparatus 100 was releasably secured utilizing the first adhesive strip 80 and the second adhesive strip 85 to the vertically oriented wall generally underneath a work area. The body 20 was folded along the longitudinal seams 60 to form cavity 95. Cavity 95 is operable to substantially receive and store the debris from the exemplary work area 77. While the exemplary use of the debris collection apparatus 100 has been disclosed herein wherein the body 20 is secured to a vertically oriented wall, it is to be understood that the debris collection apparatus 100 is intended for use in horizontal orientations as well such as but not by way of limitation a countertop or floor.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:
1. A debris collection apparatus comprising:
a container, said container having a plurality of walls forming an interior volume, said container having an opening providing access to said interior volume;
a body, said body being planar in manner, said body having a first configuration and a second configuration, said body in said first configuration being disposed within said container, said body having an upper surface and a lower surface, said body having a first end and a second end, said body having a front edge and a rear edge;

a support tube, said support tube disposed within said container, said body being surroundably mounted to said support tube;

wherein said body is operable to be dispensed in portions and subsequently manipulated into a second configuration wherein in said second configuration said body is operable to collect debris at least one adhesive strip, said at least one adhesive strip disposed on said lower surface, said at least one adhesive strip extending longitudinally intermediate said first end and said second end, said at least one adhesive strip proximate said front edge;

at least one longitudinal seam, said longitudinal seam extending intermediate said first end and said second end, said longitudinal seam configured to facilitate said body being folded into said second configuration, said longitudinal seam being a perforated line;

a serrated edge, said serrated edge proximate said opening of said container;

a plurality of lateral seams, said plurality of lateral seams extending intermediate said rear edge and said at least one longitudinal seam; and wherein in said second configuration said body is formed into a first portion and a second portion, said second portion being generally perpendicular to said first portion.

2. A disposable debris collection apparatus that is operable to be dispensed to collect debris comprising:

a container, said container having a plurality of walls forming an interior volume, said container being generally rectangular in shape, said container having an opening, said container further including a hingedly secured lid operable to substantially cover said opening;

a body, said body being planar in manner and generally rectangular in shape, said body having a first end and a second end, said body having a front edge and a rear edge, said body having a first configuration and a second configuration, said body having an upper surface and a lower surface;

a support tube, said support tube being cylindrical in shape, said support tube disposed within said interior volume of said container, said support tube operable to receive said body in said first configuration wherein said body is surroundably mounted thereto;

wherein in said second configuration a portion of said body has been dispensed from said container and has been folded into a first section and a second section wherein said first section and said second section are perpendicular in manner at least one adhesive strip, said at least one adhesive strip disposed on said lower surface of said body, said at least one adhesive strip extending from said first end to said second end, said at least one adhesive strip being proximate said front edge of said body; and a plurality of longitudinal seams, said plurality of longitudinal seams extending intermediate said first end and said second end, said plurality of longitudinal seams being proximate said rear edge of said body.

3. The disposable debris collection apparatus as recited in claim 2, wherein said body is operable to be secured to a vertically oriented wall subsequent being placed in said second configuration so as to collect debris falling downward and adjacent thereto.

4. The disposable debris collection apparatus as recited in claim 3, wherein said at least one adhesive strip is manufactured from a pressure sensitive adhesive.

5. The disposable debris collection apparatus as recited in claim 4, wherein said body is manufactured from a heavy bond paper.

6. The disposable debris collection apparatus as recited in claim 5, and further including a plurality of lateral seams, said plurality of lateral seams extending intermediate said rear edge and one of said plurality of longitudinal seams.

7. A disposable debris collection apparatus configurable to collect debris from a horizontal surface or a vertical surface comprising:

a container, said container having a plurality of walls forming an interior volume, said container being generally rectangular in shape, said container having an opening, said container further including a hingedly secured lid operable to substantially cover said opening, said container further including a serrated edge proximate at least a portion of said opening;

a body, said body being planar in manner and generally rectangular in shape, said body having a first end and a second end, said body having a front edge and a rear edge, said body having a first configuration and a second configuration, wherein in said first configuration said body is disposed within said interior volume of said container, said body having an upper surface and a lower surface;

a first adhesive strip and a second adhesive strip, said first adhesive strip and said second adhesive strip being disposed on said lower surface of said body, said first adhesive strip being proximate said front edge, said second adhesive strip being proximate and parallel to said first adhesive strip;

a support tube, said support tube being cylindrical in shape, said support tube disposed within said interior volume of said container, said support tube operable to receive said body in said first configuration wherein said body is surroundably mounted thereto;

wherein in said second configuration a portion of said body has been dispensed from said container and has been folded into a first section, a second section and a third section and wherein said first section, said second section and said third section are perpendicular in manner with respect to each other; and a plurality of longitudinal seams, said plurality of longitudinal seams extending intermediate said first end and said second end, said plurality of longitudinal seams being proximate said rear edge of said body.

8. The disposable debris collection apparatus as recited in claim 7, wherein said plurality of longitudinal seams are perforated lines.

9. The disposable debris collection apparatus as recited in claim 8, wherein said body is operable to be secured to a vertically oriented wall subsequent being placed in said second configuration and wherein said second section and said third section of said body are operable to collect debris falling downward and adjacent thereto.

10. The disposable debris collection apparatus as recited in claim 9, and further including a plurality of lateral seams, said plurality of lateral seams extending intermediate said rear edge and one of said plurality of longitudinal seams.

11. The disposable debris collection apparatus as recited in claim 10, wherein said body is manufactured from a heavy bond paper.

* * * * *